(12) United States Patent
Battle

(10) Patent No.: US 6,462,743 B1
(45) Date of Patent: Oct. 8, 2002

(54) PIPELINE PROCESSING SYSTEM AND METHOD

(75) Inventor: James T. Battle, San Jose, CA (US)

(73) Assignee: ATI International Srl (BB)

( * ) Notice: Subject to any disclaimer, the term of this patent is extended or adjusted under 35 U.S.C. 154(b) by 0 days.

(21) Appl. No.: 09/467,945

(22) Filed: Dec. 21, 1999

(51) Int. Cl.$^7$ ................................................. G06T 1/20
(52) U.S. Cl. ........................................ 345/506; 345/522
(58) Field of Search ................................ 345/506, 502, 345/503, 505, 522, 559

(56) References Cited

U.S. PATENT DOCUMENTS 6,169,554 B1 * 1/2001 Deering ........................ 345/503
6,208,361 B1 * 3/2001 Gossett ........................ 345/506

\* cited by examiner

Primary Examiner—Kee M. Tung
(74) Attorney, Agent, or Firm—Vedder, Price, Kaufman & Kamholz

(57) ABSTRACT

A novel pipeline processing system includes a parameter bus and a command processor. The command processor receives a command, generates a word in response to the command, and transmits the word on the parameter bus. The word includes information identifying whether the word includes state parameter data and information identifying whether the word includes immediate mode parameter data. A plurality of pipeline stages are positioned along the parameter bus. Each pipeline stage has a state register and a logic block both connected to the parameter bus. The state register receives the word and stores the state parameter data included in the word in response to the information identifying whether the word includes state parameter data. The logic block receives the word and performs a logic operation using state parameter data stored in the state register and the immediate mode parameter data included in the word in response to the information identifying whether the word includes immediate mode parameter data. This pipeline processing system allows state parameter changes to be effected in the pipeline without first draining the pipeline of existing data.

4 Claims, 3 Drawing Sheets

PIPELINE PROCESSING SYSTEM AND METHOD

TECHNICAL FIELD OF THE INVENTION

The present invention relates generally to three-dimensional graphics processing, and in particular to a pipeline processing system and method.

BACKGROUND OF THE INVENTION

In computer graphics, the surfaces of 3-D objects are approximated using polygons (typically triangles). Using smaller polygons creates more realistic 3-D objects on the computer screens. However, using smaller polygons requires a larger number of polygons to represent an object.

Surfaces of objects and the polygons representing the surfaces are provided in a three dimensional coordinate system, typically referred to as "object space" O(x, y, z). However, graphical displays used with computers and consumer video equipment are only two dimensional. Therefore, an image of the objects is displayed on a graphical display by projecting the object onto a two-dimensional coordinate system, typically referred to as "screen space" S(x, y).

Generally, a polygon can be described by the polygon's vertices. Typically the description of a vertex includes the coordinates of the vertex in object space, i.e. (x, y, z); perspective projection parameters (w, s, t); the color of the vertex, typically using color space coordinates (r, g, b); an alpha parameter; and a fog parameter. The vertex information is processed through well known setup processes into a parameter list suitable for a 3-D pipeline. The exact parameter list format depends on the 3-D pipeline used.

The 3-D pipeline performs rasterization of the polygons, i.e. the conversion of polygons into pixels in screen space. A common rasterization algorithm for polygons includes four major steps: walk edges, walk spans, compute texture coordinates, and compute fog value. Many elements of the theory and techniques of rasterization are known to those skilled in the art.

Texturing pixels is a technique for mapping an image ("texture") onto the polygonal surfaces of a computer-generated object, so as to allow the object to appear more realistic in a displayed scene. Texture mapping allows a texture to be superimposed onto each polygon of an object, using transformation techniques that compensate the appearance of the texture in each polygon for lighting conditions, angles of viewing and other conditions which may affect the appearance of the object. Many elements of the theory and techniques of texture mapping are known to those skilled in the art.

As screen space pixels are generated by rasterization, the screen space pixels are blended in a blender or back end processor to create 2-D images suitable for graphic displays. Specifically, the blender or back end processor performs Z-buffering and alpha blending on the screen space pixels. Z-Buffering determines which screen space pixels can be seen on the graphics screen. Specifically, z-buffering compares the z-coordinate of each screen space pixel against the z-coordinate of the screen space pixel with the same x- and y-coordinates already in the frame buffer. If the screen space pixel is in front of the frame buffer pixel, the parameters of the screen space pixel is stored in the frame buffer; otherwise the contents of the frame buffer remain unchanged. The frame buffer is typically addressed by mapping the x and y coordinates of a pixel into a memory address. The frame buffer stores parameters regarding the pixel such as color space values and the z-coordinate. Alpha blending controls the translucence of overlaid surfaces. The screen space pixels are stored in a frame buffer for displaying on a graphics display. Many elements of the theory and techniques of z-buffering and alpha blending are known to those skilled in the art.

For realistic 3-D graphics, a 3-D image may include thousands of polygons for real-time applications or even millions of polygons for high-resolution 3-D images. Since many calculations are required to render each polygon, a high-quality image can consume a large amount of processor time. Thus, performance and image quality are often competing considerations due to the limited processing speeds available. Any decrease in the processing time required to render an image component polygon is desirable, since it enables either higher-quality graphics to be produced at a given frame rate or faster rendering of a given image.

SUMMARY OF THE INVENTION

Therefore, a need has arisen for a three-dimensional graphics processing system that addresses the disadvantages and deficiencies of the prior art. In particular, a need has arisen for a pipeline processing system with enhanced efficiency.

Accordingly, a novel pipeline processing system is disclosed. In one embodiment, the pipeline processing system includes a parameter bus and a command processor. The command processor receives a command, generates a word in response to the command, and transmits the word on the parameter bus. The word includes information identifying whether the word includes state parameter data and information identifying whether the word includes immediate mode parameter data. A plurality of pipeline stages are positioned along the parameter bus. Each pipeline stage has a state register and a logic block both connected to the parameter bus. The state register receives the word and stores the state parameter data included in the word in response to the information identifying whether the word includes state parameter data. The logic block receives the word and performs a logic operation using state parameter data stored in the state register and the immediate mode parameter data included in the word in response to the information identifying whether the word includes immediate mode parameter data.

An advantage of the present invention is that state parameter changes may be effected in the pipeline using the same parameter bus as is used for carrying other data. Another advantage of the present invention is that state parameter changes may be effected in the pipeline without first draining the pipeline of existing data.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
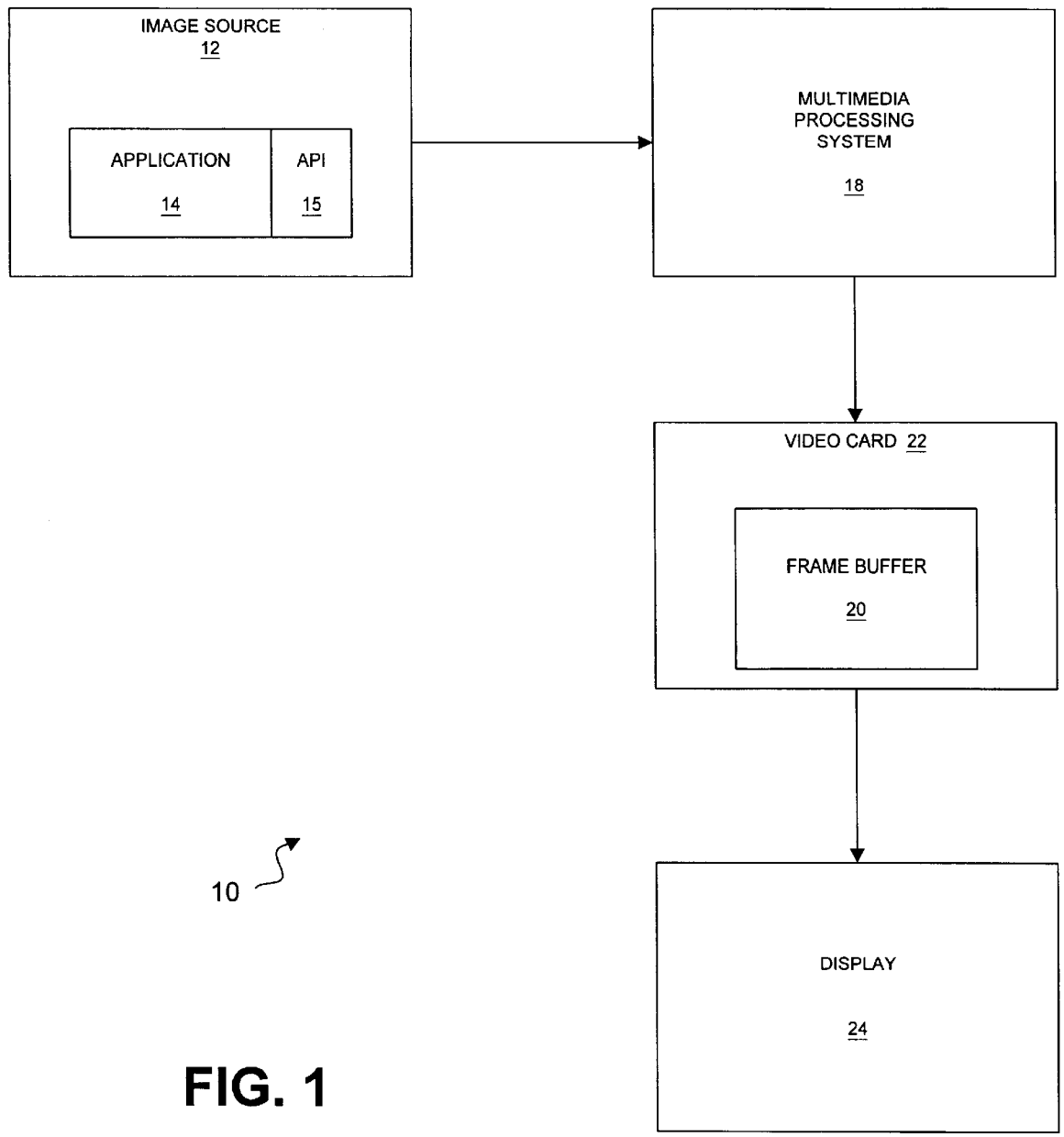
FIG. 1 is a block diagram of a graphics processing and display system.
Figure 2:
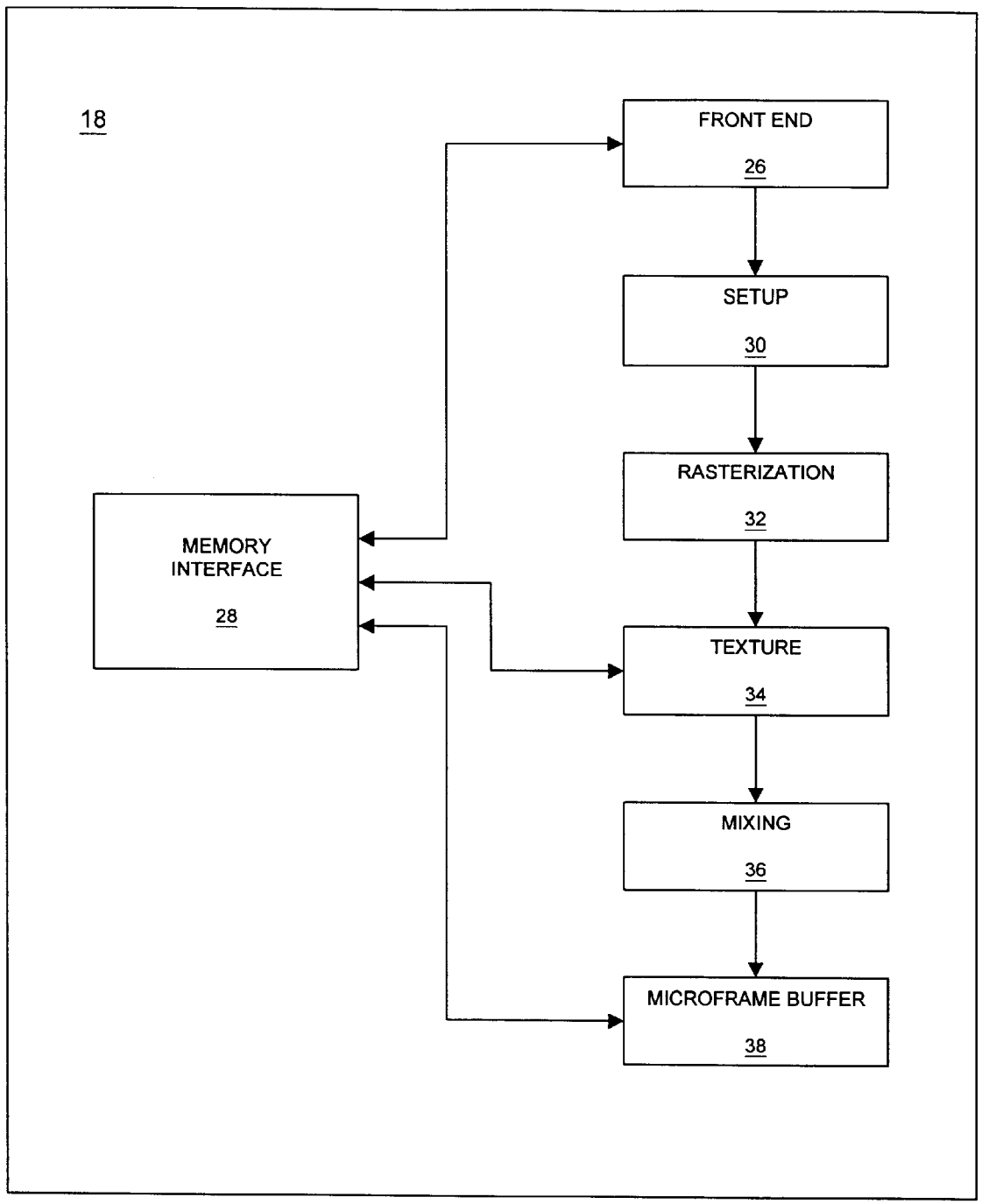
FIG. 2 is a simplified block diagram of a multimedia processing system for use in the graphics processing and display system.
Figure 3:
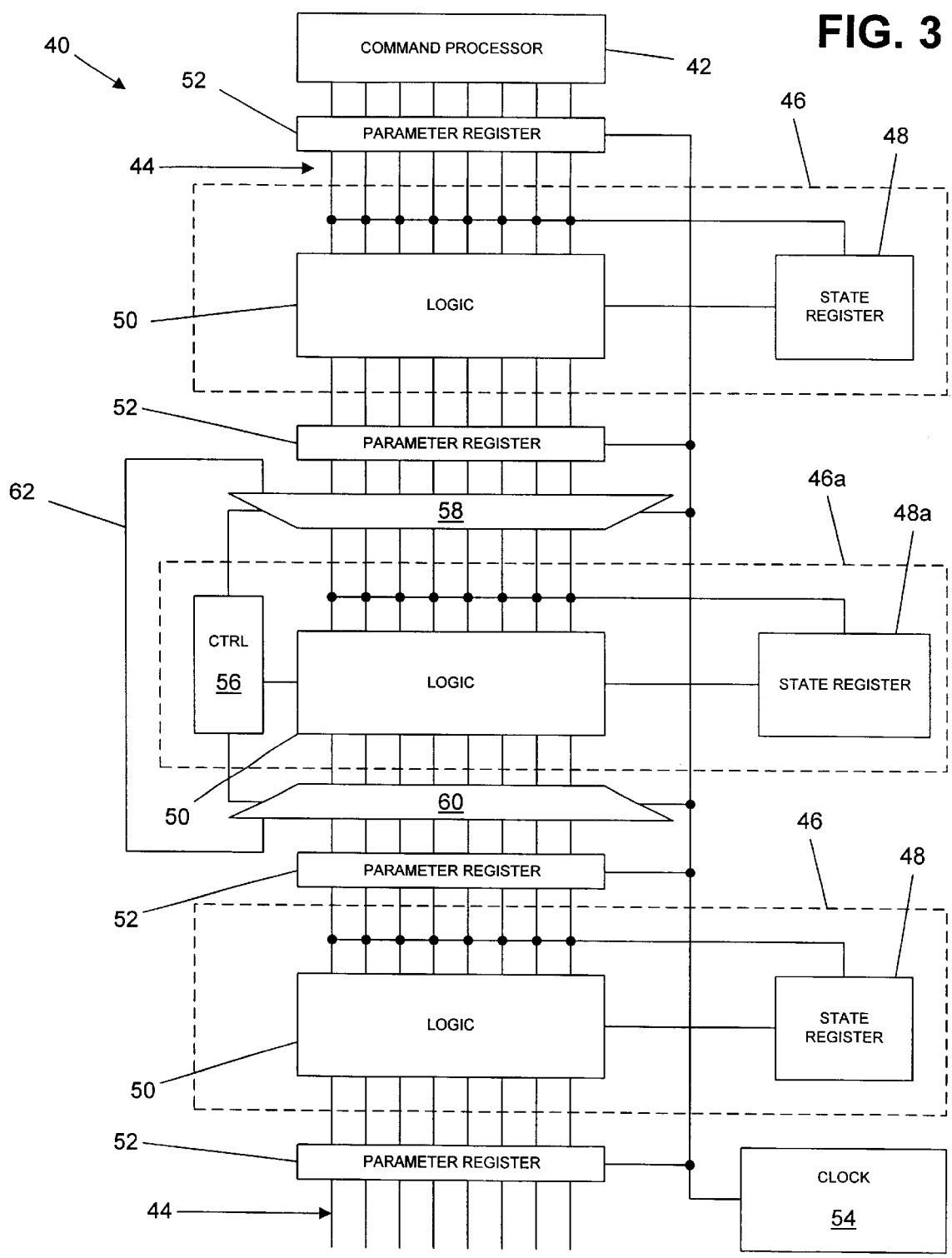
FIG. 3 is block diagram of a pipeline for performing graphics calculations in accordance with the present invention.

The preferred embodiments of the present invention and their advantages are best understood by referring to FIGS. 1, 2 and 3 of the drawings. Like numerals are used for like and corresponding parts of the various drawings.

Referring to FIG. 1, a block diagram of a graphics processing and display system 10 is shown. Graphics system 10 includes an image source 12, which generates image data in the form of image component polygons. In particular, image source 12 may be a microprocessor executing an application 14, such as a video game, that uses an application program interface 15 utilizing a 3-D library such as Direct3D™ or OpenGL™.

Image source 12 generates a series of image data sets, each representing an image component polygon such as a triangle. Thus, each image data set may include x-, y- and z-coordinates for each of the three triangle vertices, as well as color information associated with each triangle vertex. Each image data set may also include quantities such as a transparency factor (alpha) for each vertex, texture map coordinates, a fog value and a perspective correction value. Image source 12 also generates a series of commands, such as "draw triangle" commands or change state parameter commands, that are needed to create the image in question.

In generating the three-dimensional image data, image source 12 preferably performs such well-known image processing steps as coordinate transformation to account for a particular "point of view" in object space, application of lighting effects to determine diffuse and specular reflection as seen from the appropriate point of view, and clipping to eliminate off-screen image components. Alternatively, one or more of these functions may be performed by a multimedia processing system 18.

The three-dimensional image data generated by image source 12 is transmitted to multimedia processing system 18. Multimedia processing system 18 may include a graphics accelerator card or chip separate from the main microprocessor of image source 12, or may comprise a set of multimedia logic located on the same processor chip with image source 12.

Multimedia processing system 18 processes the three-dimensional image data to generate data representing a two-dimensional point-of-view image. This two-dimensional image data is stored in a frame buffer 20 on a video processing unit 22, from which a display image may be created in a conventional manner on a display system 24. Video processing unit 22 may be, for example, a commercially available SVGA video card, or some other video card. Alternatively, video processing unit may be integrated on the main microprocessor of image source 12.

It will be understood that frame buffer 20 may in fact comprise two frame buffers used alternately to provide an image to display system 24 using the well-known "double-buffering" technique. Display system 24 may be, for example, a personal computer monitor, a virtual reality goggle screen or some other visual display.

In order to create two-dimensional image data for frame buffer 20, multimedia processing system 18 must determine a color value or set of color values for each pixel stored in frame buffer 20. This may require interpolating colors between the vertices of an image component triangle, determining whether any given pixel is within or outside a particular image component triangle, texture mapping and resolving the occlusion of more distant image components by more proximate image components, while taking into account the transparency of nearer image components (known as alpha-blending). This processing may require many calculations for each individual pixel of the final image, and is therefore very time-consuming. Multimedia processing system 18 is designed to perform the necessary calculations quickly and efficiently.

Referring to FIG. 2, a simplified block diagram of multimedia processing system 18 is shown. Multimedia processing system 18 includes a front-end processor 26, which receives graphics commands from image source 12, such as a command to draw a specified image component triangle. Front-end processor 26 retrieves the triangle data from memory via a memory interface unit 28, converts variable vertex formats into a canonical format, and passes the command with triangle data to a setup unit 30 as a discrete data set.

Setup unit 30 receives the command and triangle data set from front-end processor 26 and calculates triangle parameters suitable for rasterization. Specifically, setup unit 30 calculates interpolation parameters for each triangle parameter that is to vary continuously from vertex to vertex. For example, assuming that a diffuse red intensity value was specified for each vertex of the triangle, setup unit 30 may assume that the diffuse red intensity function varies linearly from vertex to vertex. Setup unit 30 then calculates partial derivatives of the diffuse red intensity function in the x- and y-directions, and calculates a diffuse red intensity value for an initial set of coordinates in or near the triangle. The partial derivatives, initial value and initial coordinates may be used at a later stage to calculate a diffuse red intensity value at any location within the triangle, as will be described below. Likewise, partial derivatives and initial values are calculated for other parameters to be interpolated ("interpolants"), such as specular red intensity, diffuse and specular green and blue intensity, transparency factor, texture coordinates, fog factor, z-coordinate, homogenizing factor and edge functions that are used to determine whether a particular point is inside or outside the triangle.

Setup unit 30 passes the calculated interpolant parameters to a rasterization engine 32. Rasterization engine 32 calculates a value for each interpolant at various coordinates representing pixel locations in or near the triangle. The interpolated texture coordinates (if any) calculated by rasterization engine 32 are passed to a texture unit 34, which accesses one or more texture bitmaps to determine texture values for each pixel.

The triangle data, including texture values calculated by texture unit 34 and interpolant values calculated by rasterization engine 32, are passed to a mixing unit 36, which mixes the texture values with the interpolated specular and diffuse RGB values, as well as the interpolated fog factor, to generate a stream of pixel data, in which each pixel data set includes x-, y- and z-coordinates, RGB values and an interpolated transparency factor.

The pixel data may be passed directly to frame buffer 20 on video processing unit 22. Alternatively, the image space in question may be divided into sections, each section having a set of pixels that is processed as described above and stored in a microframe buffer 38 prior to being passed on to frame buffer 20. While microframe buffer 38 is not necessary to practice the present invention, the ability to access microframe buffer 38 at high speeds to perform z-buffering and alpha-blending may result in increased image rendering speed.

Either microframe buffer 38 or frame buffer 20 compares the z-coordinate of each incoming pixel to the z-coordinate of the existing pixel at that x-y location (if any) to determine whether the incoming pixel should replace the existing pixel. The frame buffer in question also uses the interpolated transparency factors of the incoming pixel and the existing pixels, as appropriate, to alpha-blend the incoming pixel with the existing pixel. The frame buffer in question then stores the blended pixel data for display by display system 24. If a microframe buffer 38 is utilized, then the pixel data stored therein is transferred to frame buffer 20 after the processing of all image components intersecting the image section covered by microframe buffer 38.

The calculations performed by rasterization engine 32, texture unit 34, mixing unit 36 and microframe buffer 38 as described above may be performed more quickly and efficiently using deep pipeline processing, in that more than one command and/or data for more than one pixel may be processed simultaneously.

Referring to FIG. 3, a pipeline 40 for performing graphics calculations is shown. Pipeline 40 may be implemented in multimedia processing system 18 to perform one or more of the functions performed by multimedia processing system 18 as described above. In one embodiment described herein, pipeline 40 represents a logic-level implementation of rasterization engine 32, texture unit 34, mixing unit 36 and microframe buffer 38, as well as a portion of setup unit 30.

Pipeline 40 includes a command processor 42 that generates a set of parameters for graphics processing. In one embodiment, command processor 42 is a part of setup unit 30. The parameters generated by command processor 42 fall into two general classes: state parameters and immediate mode parameters. State parameters are generally applicable to more than one image component polygon being processed by pipeline 40, and may include such parameters as a z-compare direction, an affine vs. perspective mapping flag, alpha-blending mode parameters, and a texture mapping activation/deactivation flag. Immediate mode parameters are generally parameters which are applicable only to the current image component polygon, and may include such parameters as x-, y- and z-coordinates of a pixel, color values, transparency values and texture map coordinates. In a more general pipeline processing system, state parameters are generally used for more than one computation at a pipeline stage, while immediate mode parameters are generally used for a single computation at a pipeline stage, as will become apparent from the following description.

A parameter bus 44 carries the parameters generated by command processor 42. Pipeline 40 also has many pipeline stages 46, 46a, of which only a few are shown in FIG. 3 for illustrative purposes. Each pipeline stage 46, 46a includes a state register 48, which stores state parameters applicable to that pipeline stage. Each pipeline stage 46, 46a also includes a logic block 50, which receives immediate mode parameters from parameter bus 44 and state parameters from state register 48. Each logic block 50 performs logic operations using the immediate mode parameters and state parameters, and outputs the results on parameter bus 44.

A parameter register 52 is positioned before and after each pipeline stage 46, 46a. Parameter registers 52 latch the values on parameter bus 44 when prompted to do so by a common clock signal from a clock signal source 54.

To achieve maximum efficiency in pipeline 40, each pipeline stage 46, 46a may be designed to perform as many (and only as many) logic operations as are practically achievable in a single clock cycle. In other words, each logic block 50 may include a series of logic gates and other digital signal processing circuits (not shown), such that the total ripple-through time of the logic block 50 is close to, but less than, one complete clock cycle. The results of the logic operation are then latched by the parameter register 52 immediately downstream of the pipeline stage 46 in question at the beginning of the next clock cycle. At the same time, the parameter register 52 immediately upstream of the pipeline stage 46 in question also latches a set of parameter values derived from a previous pipeline stage 46. The parameter values from his upstream parameter register 52 are used as input by the pipeline stage 46 in question. Thus, each pipeline stage 46, 46a receives a new set of input values at the beginning of each clock cycle and generates a new set of output values near the end of each clock cycle.

As a result of this efficiency-based partitioning of logic operations into stages, a discrete set of logic operations may be performed by more or less than a single logic block 50. For example, a texture cache access step, in which texture coordinates are used to access texture elements or "texels" from a texture memory, may require logic circuitry with a total ripple-through time of approximately one-half of a clock cycle. Rather than dedicating an entire logic block 50 to this operation, and thereby wasting one-half of a clock cycle while the output values wait to be latched by a parameter register 52, only one-half of a logic block 50 may be dedicated to this task, with the remaining one-half of a logic block 50 being dedicated to the performance of at least a portion of a separate logic operation, such as a texture blend operation which may take, for example 2½ clock cycles. Thus, it will be understood that parameter bus 44 may carry intermediate output values from incomplete logic operations which are to be completed in subsequent pipeline stages 46, 46a. Furthermore, it will be understood that parameter bus 44 need not be uniform and linear as shown, but may include iterative loops and branches.

Command processor 42 receives commands such as a "draw triangle" command followed by a set of parameters for the triangle to be drawn. Other commands may implicitly or explicitly change state parameters used by one or more pipeline stages 46, 46a.

In some conventional pipeline processing systems, state parameter changes would be handled by command processor 42 as follows: First, command processor would "starve" parameter bus 44 of any new input until pipeline 40 had been "drained," or all logic operations performed by pipeline stages 46, 46a had been completed and the results presented at the terminus of pipeline 40. Then, state parameters would be broadcast to the state registers 48 in all pipeline stages 46, 46a on a separate state parameter bus (not shown). Command processor 42 would then resume processing of immediate mode parameters by resuming normal operation of parameter bus 44.

This method of changing state parameters is inefficient because a number of clock cycles equal to the number of pipeline stages 46, 46a is wasted while pipeline 40 is drained. This method is particularly inefficient when the image space in question is divided and processed in sections for storage in microframe buffer 38 as previously described, since this image space subdivision generates a large number of state changes. However, if state parameter changes are to be broadcast simultaneously to all state registers 48, draining the pipeline represents the only way to ensure that logic operations which were initiated (and which should be completed) using the "previous" set of state parameters are not affected by the "new" set of state parameters. In accordance with one aspect of the present invention, pipeline 40 utilizes a more efficient method for changing state parameters without affecting the completion of ongoing logic operations, as will become apparent from the following description.

Command processor 42 generates, in response to a command, a word or set of words that embody the command. Each word consists of several segments. The meaning assigned to each word segment depends on whether the word is pixel data or a state change command. The names and lengths of the various segments are set forth in Table A.

TABLE A

| Bits | 0–1 | 2–13 | 14–25 | 26–57 | 58–89 | 90–?? |
|---|---|---|---|---|---|---|
| Pixel Data | word type | x-coord. | y-coord. | ARGB payload | z-coord. | other |
| State Change | word type | opcode | subword | not used | not used | |

For both pixel data words and state change command words, the first two bits represent the word type. The two-bit word type segment designates the word as an empty word (e.g., word type 00), a state change command word (e.g., word type 01), a "live" pixel data word (e.g., word type 10) or a "dead" pixel data word (e.g., word type 11).

An empty word is to be ignored by the pipeline stages 46, 46a, and acts only as a place-filler. A state change command word carries a payload of state parameters to be loaded by one or more state registers 48 at one or more pipeline stages 46, 46a, as will be described below. A pixel data word carries a payload of immediate mode parameters for processing by one or more logic blocks 50 at one or more pipeline stages 46, 46a. A "dead" word occurs only at later stages of pipeline 40, and denotes a pixel which has already been carried out by the intended pipeline stages 46, 46a, so that the data in question is no longer needed in pipeline 40 other than for pixel counting purposes, for example.

For pixel data words, the next 24 bits represent the 12-bit x- and y-coordinates of the pixel in question. The next 32 bits contain the alpha, red, green and blue values for the pixel. Next is the z-coordinate of the pixel, with a length of, for example, 32 bits. After the z-coordinate the word may contain various other segments such as texture coordinates associated with the pixel. These latter segments may be "consumed" at some stage in pipeline 40. Thus, the overall length of a word may vary at different stages of pipeline 40.

In state change command words, the twelve bits following the word type contain an opcode, which identifies the particular command embodied in the word. Examples of state change commands include a chromakey_color command (opcode 000000000001), which selects a particular color value as the chromakey; a chromakey_enable command (opcode 000000000010), which causes the chromakey color to be implemented; and a z-compare command (opcode 000000000011), which compares a pixel z-coordinate to the z-coordinate of a pixel already stored in the frame buffer to determine when to replace the frame buffer pixel.

The subword segment utilizes a serial numbering scheme to establish the relationship between words of a multi-word command. For example, if a command requires a large payload (more than 32 bits), then the command will be conveyed by a series of words, with the first word having as its subword segment "000000000000," the second word having as its subword segment "000000000001," the third word having a subword segment "000000000010," and so on. The 32-bit payload is a set of data associated with the command.

The opcode, subword and payload segments may each utilize less than its allotted number of bits. For example, only seven of the 12 opcode bits may be used to identify commands, if the total number of commands is less than 128. Likewise, only six of the 12 subword bits may actually be used in designating subwords, if no command requires more than 64 words to communicate.

To carry the 58 or more bits of a word in parallel, parameter bus 44 has at least 58 wires. Accordingly, each parameter register 52 has at least 58 storage locations for latching the signal values on each of the wires. Of course, it will be understood that the number of wires in parameter bus 44 may vary at different stages of pipeline 40. It will be understood that data transmitted in a serial fashion over one or more conductors in a serial bus may alternatively be used.

When a command word is received at a pipeline stage 46, 46a, both the logic block 50 and the state register 48 of the pipeline stage 46, 46a receive and examine the command word to determine what action is to be taken. State register 48 analyzes the word type segment to determine whether the word is a state change command word. If not, then state register 48 ignores the word and takes no action.

If the word is a state change command word, then the logic block 50 ignores the word while the state register 48 examines the opcode segment of the word to determine whether the state change to be effected by the word is relevant to the operations being performed by the pipeline stage 46, 46a in question, or in other words whether the state change command word seeks to change state parameters that are stored in the state register 48 in question. If the state change command is relevant to the pipeline stage 46, 46a in question, then the state register 48 stores the relevant portion (s) of the payload segment of the state change command word (and the payload segments of any following state change command words with incrementing subword segments, indicating that they are part of the same state change command). If the state change command is not relevant to the pipeline stage 46, 46a in question, then the state register 48 ignores the word and takes no action.

If the word is a pixel data word, then the state register 48 ignores the word, while the logic block 50 utilizes the pixel values of the pixel data word, along with the input from state register 48, to perform its logic operations.

In the above-described pipeline operation, a state change command word may be generated by command processor 42 immediately following a series of pixel data words without affecting the processing of the pixel data words. The state change command word "follows" the pixel data words through pipeline 40, causing state parameter changes as it passes through each pipeline stage 46, 46a. Thus, state parameter changes occur at any give pipeline stage 46, 46a only after the stage has finished processing the preceding pixel data words. Pipeline 40 may therefore be "fully loaded" with pixel data words and state change command words, increasing the efficiency of pipeline 40 over that of a processing pipeline that must be "drained" before a state parameter change may be effected.

Pipeline 40 need not have any recursive or iterative calculations which require that pixel data be looped back through the same pipeline stage 46, 46a one or more times. However, for some operations, it may be economical to have such iterative loops rather than duplicating the logic circuitry that performs a set of calculations. For example, when more than one texture is to be applied to a pixel, the pixel has a number of sets of texture coordinates associated with it. A given set of stages in pipeline 40 may be used to apply a single texture to a pixel. Duplicating these pipeline stages, as would be required to sequentially apply multiple textures to a single pixel in a linear pipeline, would unnecessarily consume chip real estate. Thus, a single set of pipeline stages may be used iteratively to apply one texture at a time to any pixel. Each pixel word is therefore looped multiple time through the same set of pipeline stages. In this case, it is clear that a state parameter change should not be effected at the pipeline stage(s) 46, 46a in question until the preceding pixel data words have been completely processed and passed on from the pipeline stage 46, 46a.

There are at least two ways to handle such iterative loops. One method is to intermittently starve pipeline 40 at its top so as to allow the iterative loop to be completed before the next pixel data word or state change command word arrives at that pipeline stage. For example, when three-pass texture blending is being performed, a series of pixel data words each containing three texture coordinates is generated by command processor 42. Between any two pixel data words, two "empty" words are inserted by command processor 42 as place-fillers. Thus, pipeline 40 has only a one-third duty cycle. When the texture blend section of pipeline 40 is reached, the "empty" words may be deleted, and their places taken by pixels on their second or third pass through the texture blend section.

Alternatively, or in conjunction with the method described above, the iterative loop section of pipeline 40 may have the capability to "freeze" the data in all preceding stages of pipeline 40 if and when the iterative loop section has reached its maximum capacity.

To illustrate the above-described methods, pipeline stage 46a in FIG. 3 is shown as a single-stage iterative loop. That is, a control block 56 monitors and controls the operation of the logic block 50 and state register 48a for this pipeline stage 46a, as well as providing a select signal for an input multiplexer 58 and an output multiplexer 60 for pipeline stage 46a. Thus, when iterative calculations are to be performed on a set of pixel data, control block 56 generates a select signal such that output multiplexer 60 diverts the output of pipeline stage 46a from parameter bus 44 to a feedback line 62. The same select signal causes input multiplexer 58 to select input from feedback line 62 rather than parameter bus 44 for the input of pipeline stage 46a. Thus, any "empty" pixel words being presented to input multiplexer 58 on bus 44 following a "live" pixel word are ignored.

When control block 56 determines that iterative calculations are not to be performed at pipeline stage 46a, or that iterative calculations have been completed for a set of pixel data, the select signal from control block 56 causes input multiplexer 58 and output multiplexer 60 to select parameter bus 44 as the input source and output destination, respectively, for pipeline stage 46a. As previously stated, an iterative loop such as that illustrated in FIG. 3 may include multiple pipeline stages 46, 46a rather than a single stage 46a.

Control block 56 must ensure that state register 48a of pipeline stage 46a does not register a state parameter change until iterative calculations have been completed for all pixel data words preceding the state change command word. If the pipeline duty cycle is reduced through the insertion of empty words by command processor 42, then a state change command word may be processed by pipeline stage 46a when received. If pipeline stage 46a reaches maximum capacity while "live" words (such as a state change command word) are still being presented on bus 44, then control block 56 may be required to "freeze" the data in all preceding pipeline stages 46 until pipeline stage 46a completes its iterative operation. This may be accomplished by means of a control signal transmitted by control block 56 to each parameter register 52 preceding pipeline stage 46a. This control signal may cause the parameter registers 52 to hold their existing data until the control signal is deasserted.

Of course, other means for enabling non-linear pipeline operation may be envisioned. Moreover, the capability to handle non-linear pipeline operation is not required to practice the present invention.

Although the present invention and its advantages have been described in detail, it should be understood that various changes, substitutions, and alterations can be made therein without departing from the spirit and scope of the invention as defined by the appended claims.

I claim:

1. A pipeline processing system comprising:

a parameter bus;

a command processor operable to receive a command, and operable to generate a word in response to the command, and operable to transmit the word on the parameter bus, the word including information identifying whether the word includes state parameter data, the word further including information identifying whether the word includes immediate mode parameter data;

a plurality of pipeline stages positioned along the parameter bus, each pipeline stage having a state register and a logic block both connected to the parameter bus, the state register being operable to receive the word and store the state parameter data included in the word in response to the information identifying whether the word includes state parameter data, the logic block being operable to receive the word and perform a logic operation using state parameter data stored in the state register and the immediate mode parameter data included in the word in response to the information identifying whether the word includes immediate mode parameter data.

2. The pipeline processing system of claim 1, further comprising a plurality of parameter registers positioned along the parameter bus in between the pipeline stages, the parameter registers being operable to latch signal levels occurring on the parameter bus.

3. A method for performing pipelined calculations, comprising:

receiving a command at a command processor;

generating a word by the command processor in response to the command, the word including information identifying whether the word includes state parameter data, the word further including information identifying whether the word includes immediate mode parameter data;

transmitting the word by the command processor on a parameter bus;

receiving the word at a pipeline stage connected to the parameter bus;

storing at a state register of the pipeline stage the state parameter data included in the word in response to the information identifying whether the word includes state parameter data; and performing at a logic block a logic operation using the state parameter data stored in the state register and the immediate mode parameter data included in the word in response to the information identifying whether the word includes immediate mode parameter data.

4. A pipeline processing system comprising:

means for transmitting data;

command processing means for receiving a command, and for generating a word in response to the command, and for transmitting the word on the data transmitting means, the word including information identifying whether the word includes state parameter data, the word further including information identifying whether the word includes immediate mode parameter data;

a plurality of pipeline stages positioned along the data transmitting means, each pipeline stage having a parameter storage means and a parameter processing means both connected to the data transmitting means, the parameter storage means for receiving the word and storing the state parameter data included in the word in response to the information identifying whether the word includes state parameter data, the parameter processing means for receiving the word and perform a logic operation using state parameter data stored in the parameter storage means and the immediate mode parameter data included in the word in response to the information identifying whether the word includes immediate mode parameter data.

\* \* \* \* \*